May 9, 1967   R. T. HURLEY   3,318,744
METHOD OF LAMINATING POLYURETHANE FOAM
Filed March 27, 1963
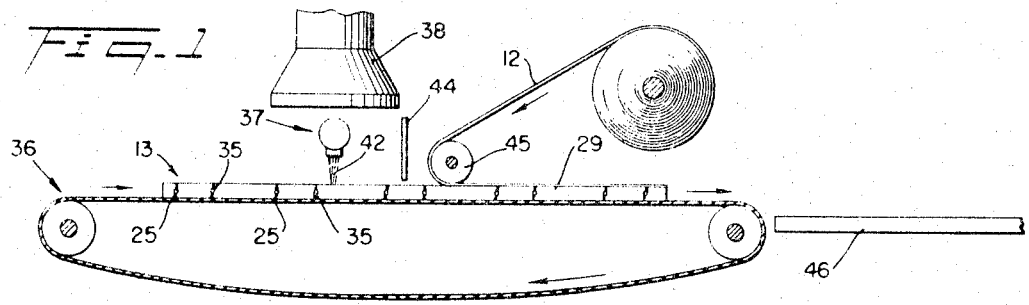
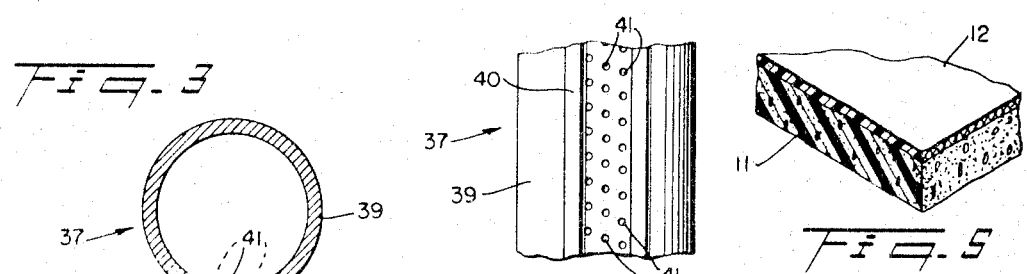
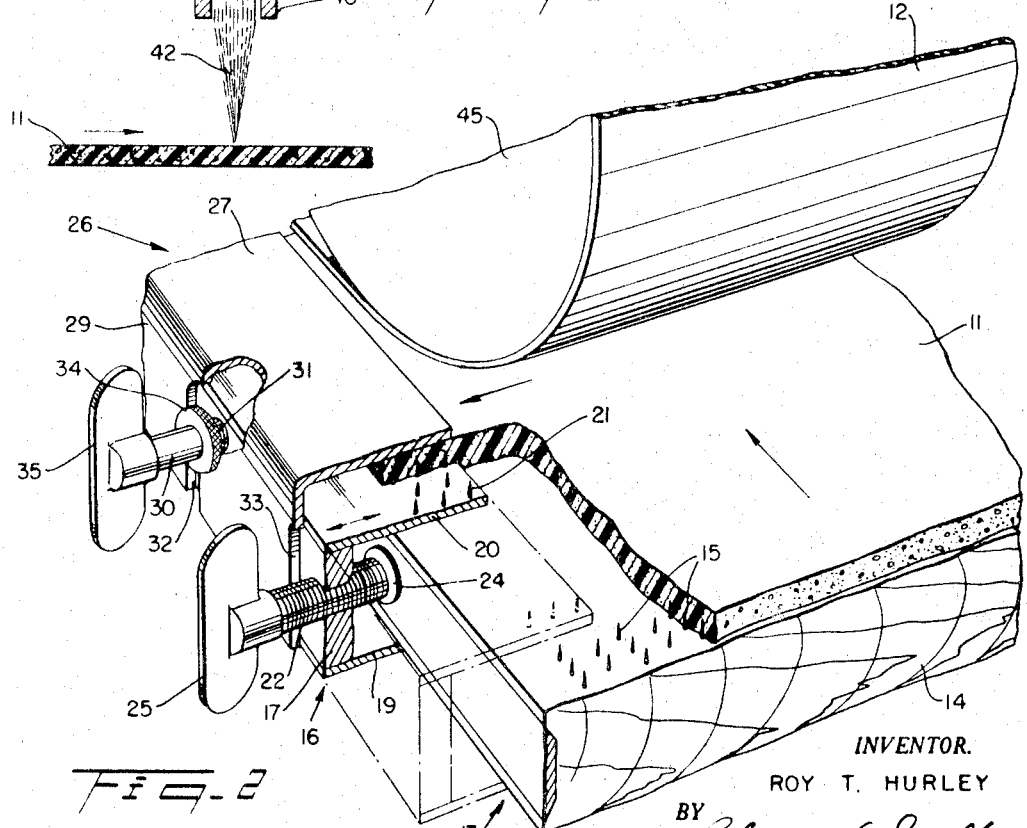
INVENTOR.
ROY T. HURLEY
BY Roberson & Smythe
ATTORNEYS

United States Patent Office 3,318,744
Patented May 9, 1967

3,318,744
METHOD OF LAMINATING POLYURETHANE FOAM
Roy T. Hurley, Santa Barbara, Calif., assignor to Reeves Brothers, Inc., New York, N.Y., a corporation of New York
Filed Mar. 27, 1963, Ser. No. 268,380
3 Claims. (Cl. 156—82)

This is a continuation-in-part of an application, Serial No. 686,345, filed Sept. 26, 1957, now abandoned.

This invention relates to a method of and an apparatus for making a composite laminated structure, and more particularly for making an extended composite sheet of plate-like structure having at least one elastically extensible layer.

The invention has among its objects the provision of a novel method of making a composite adhered structure.

Another object of the invention is the provision of a method of making an adhered laminated structure having an elastically extensible layer which eliminates wrinkles in the component layers and provides a strong uniform bond between the layers.

Still another object of the invention is to provide a method of making a composite laminated structure which may be quickly and economically carried out.

Accordingly, the invention is to a method of laminating a first layer of material to a second layer of flexible heat-fusible elastic foamed polyurethane in which the polyurethane is held under sufficient tension longitudinally along the plane of its broad extent so as to eliminate the tendency to wrinkle when it is subsequently heated. A surface of the polyurethane foam is then quickly heated to a temperature above its melting temperature, in the range of 500° F. to 800° F., and such heating should be only to a limited depth so as to render the surface of the polyurethane soft and tacky. Thereafter, the first layer of material is pressed in contact with the tacky surface of the polyurethane to effect a bond between the two layers.

The above and further objects and novel features of the invention will more fully appear from the following description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a somewhat schematic view in side elevation of one embodiment of apparatus for performing the method of the invention;

FIG. 2 is a fragmentary view in perspective of a portion of the apparatus of FIG. 1, certain parts of the apparatus being broken away for clarity of illustration;

FIG. 3 is a transverse section through heating means employed in the apparatus of FIG. 1 to render the bonding surface of one of the component layers adhesive;

FIG. 4 is a fragmentary view in bottom plan of the heating means of FIG. 3; and

FIG. 5 is a fragmentary view in perspective of a laminated structure made by the method of the invention.

This invention represents an improvement upon the invention disclosed and claimed in the prior application Ser. No. 612,698, filed Sept. 28, 1956, by John W. Dickey, now U.S. Patent No. 2,957,793, dated Oct. 25, 1960, which is concerned with the adhesive bonding of a flexible elastic web material to a backing or reinforcing layer or web of material such as cloth and the like. The flexible elastic web material particularly described is a foamed resin plastic material, for example, polyurethane foamed plastic. The composite product composed of such flexible plastic web material and the backing or reinforcing web is useful, for example, as a carpet underlay or as a garment lining, as fully set forth in said prior application.

It has been found that the apparatus and method of said prior application require somewhat close control to produce a satisfactory bond between the webs, and to maintain the layers of the product free from wrinkles. The foamed resin plastic layer has a tendency to wrinkle when one surface is heated to melting temperature. Such wrinkling is apparently caused by localized expansion of such layer, and is particularly pronounced when the layer is thin. The apparatus and method of the present invention more effectively maintain the elastic plastic layer under control during the laminating operation by maintaining such layer under appreciable tension in at least one direction during such operation so as to eliminate any tendency of the layer to buckle or wrinkle in the finished product.

There is shown in the drawing herein one embodiment of apparatus whereby the method of the present invention may be practiced to form a composite laminated product such as shown in FIG. 5. In such a figure the product is composed of a layer 11 of foamed polyurethane resin adhered to a reinforcing layer 12. In the embodiment shown layer 12 is made of a woven fabric.

The apparatus shown is adapted for forming a composite laminated product which has a definite length and is of such size that it may readily be manipulated. Consequently, the apparatus is of such character as to handle such single lengths expeditiously. It is to be understood, however, that within the scope of the invention the laminated product may be made in continuous lengths.

The apparatus includes a stretcher generally designated 13, having a stretcher board 14 which is at least as long as the composite product to be formed and somewhat exceeds such product in width. Board 14 is provided at its leading and trailing ends with a plurality of pins which extend upwardly from its upper surface. In FIG. 2 the pins on the trailing end of the board are shown at 15. In preparing layer 11 for lamination, the layer is first pressed downwardly upon the upstanding pins at one end of board 14 and is then stretched to a predetermined degree toward the other end of the board, following which layer 11 is pressed down upon the pins at such other end. The layer 11 is thus then held under predetermined longitudinal tension.

Preferably, although not necessarily, in accordance with the invention the layer 11 is also stretched laterally before being laminated with layer 12. For this purpose the stretcher 13 is provided with lateral stretcher means, generally designated 16, located along each side edge of board 14. Each stretcher means 16, of which one is shown in FIG. 2, includes an elongated U-shaped member having an elongated side plate 17 and upper and lower plates 20 and 19, respectively, secured thereto, the latter two plates receiving the edge of board 14 therebetween. The upper surface of plate 20 is provided with a plurality of upstanding pins 21 adapted to penetrate the edges of layer 11. Members 16 are adjustable laterally of board 14 by means including a plurality of longitudinally spaced studs 22 which have threaded engagement with holes through member 17. The inner ends of studs 22 have swivel feet 24 which engage the edges of the board. To facilitate adjustment of means 16, the studs 22 are provided with winged heads 25.

Preferably the above described longitudinal stretching of layer 11 is carried out with the lateral stretcher means 16 in their laterally inner positions. After the second end of layer 11 has been pressed upon its pins on the second end of the board, the side edges of layer 11 are then pressed downwardly to embed the pins into such layer. Thereupon studs 22 on both sides of the board are turned in the appropriate direction to cause the two lateral stretching means 16 to move apart, thereby to subject layer 11 to the desired lateral tension.

The stretcher 13 is preferably provided with holddown means positively engaging the edges of layer 11 to prevent such edges from slipping off their stretcher pins during the laminating operation to be described. One of such hold-down means, generally designated 26, is shown in FIG. 2.

Means 26 is composed of an elongated L-shaped member having an upper flange 27 adapted to overlie the side edges of layer 11, and a side flange 29 adapted to lie outwardly of member 17 of the respective lateral stretcher means. In the embodiment shown, the hold-down means 26 is removable from the board 14 and is placed thereon after the layer 11 has been mounted on the end and side stretcher pins and has been stretched as described. To provide for the retention of means 26, a plurality of studs 30 are provided, studs 30 having threaded inner ends 31 screwed into threaded holes in member 17. The side flange 29 of the hold-down means is provided with a plurality of vertically extending slots 32 which receive studs 30 so that member 26 may be mounted as shown in FIG. 2. Member 26, after having been pressed down upon layer 11, is clamped in place by flanges 34, affixed to studs 30, which overlie portions of flange 29 at the edges of slots in edges 32.

When the layer 11 has been thus mounted upon stretcher means 13, the stretcher means carrying the mounted layer 11 is placed upon a conveyor generally designated 36 with layer 11 facing upwardly. The conveyor carries the assembly beneath a heating means, generally designated 37, which is provided with a suitable exhaust hood 38. Heater 37 has a transverse pipe 39 which spans the layer 11, the pipe being provided at its bottom with a nozzle 40 and a plurality of orifices 41 so that a combustible mixture issuing from orifices 41 may be burned to form an elongated ribbon-type flame 42 which impinges upon the upper surface of layer 11.

The polyurethane foam useful in this invention is the heat fusible type. Heat fusible polyurethane is here understood to encompass all of the known polyester types as well as some polyether types. Generally, it should be understood that most of the available polyether foams gasify so easily upon the imposition of heat that the residue remaining is in insufficient quantity to fuse and form a bond to a second material. Thus, one can easily determine heat fusible polyurethane foam by subjecting any particular urethane foam to the relatively simple test of contacting it with an open flame and after removal from the flame examining to see whether or not there is a soft, tacky and adhesive surface thereon. This surface remains tacky and adhesive at temperatures below its melting temperature and in time it becomes a surface layer which has fused cellular edges that are harder than the remainder of the unaffected cellular polyurethane foam. In the art today, whether or not a foam is heat fusible is determined by its ability to laminate according to the method described in U.S. Patent No. 2,957,793. Heat fusible polyurethane has the characteristic that it has a very narrow temperature range in which the material exhibits thermoplastic properties as are conventionally understood in the plastic art. However, such foam does have the characteristic that if it is suddenly or quickly heated by an intense heat to a point above its melting point where the surface quickly decomposes, the residue, upon removal from the heat, will be an excellent adhesive for bonding to other materials.

Polyurethane foam melts at about 450° F. and in melted condition is adhesive. The intensity of flame 42 and the speed of travel of conveyor 36 are such that the upper surface of layer 11 is heated within the temperature range of about 500 to 800° F., so that such surface is in the desired adhesive bonding condition when it reaches the laminating zone.

At the laminating zone there is provided a roller 45, which may be driven by means not shown, which extends transversely above the conveyor and guides layer 12 from a suitable source of supply into laminating contact with the upper surface of layer 11. In order to effectively isolate the heating zone from the laminating zone, there may be provided a barrier shield 44 between them as shown in FIG. 1. After layers 11 and 12 are pressed together by roll 45, the adhesive melted bonding surface of layer 11 solidifies, thereby to bond the layers strongly together. The stretcher means 13 with the resulting composite product thereon is discharged onto a table 46 where the extending portion of layer 12 may be severed from the trailing end of the composite product and such product removed from stretcher 13. The narrow side edges of the product engaged by the lateral stretcher means may be removed by being sheared therefrom.

The composite laminated material of the invention possesses novel properties which may be appreciably varied as the tension effective upon the foamed plastic material is changed. When the elastic foamed resin material is stretched a relatively small amount and is adhered to a relatively stiff reinforcing material, the resulting product has both layers thereof lying flat, and the cell walls and interstices of the elastic foamed resin are but little elongated or otherwise deformed from the shapes which they have in the elastic foamed resin material when the latter is relaxed. As the degree of stretch of the elastic foamed resin material increases, the elongation of its cell walls and thus of its pores or interstices increases. Such deformation affects the degree of softness of the elastic foamed resin material, in general the greater the tension, within limits, to which the material is subjected the less is its resistance to deformation by a force applied normal to the plane in which the material is stretched. The change in the softness of the elastic foamed resin material upon its subjection to tension becomes less as the thickness of the layer of such material is increased. The method of the invention and the resulting product display advantages, however, with layers of elastic foamed resin material having thicknesses varying within wide limits.

Although only a limited number of embodiments of the invention have been illustrated in the accompanying drawings and described in the foregoing specification, it is to be expressly understood that various changes, such as in the relative dimensions of the parts, materials used, and the like, as well as the suggested manner of use of the apparatus of the invention, may be made therein without departing from the spirit and scope of the invention as will now be apparent to those skilled in the art. Thus, for example, a layer of material 12 may be simultaneously or sequentially bonded to a layer of elastic material 11 on both sides of the latter by use of stretcher means in the form of an open frame permitting access to both broad surfaces of layer 11.

What is claimed is:

1. The method of laminating a first relatively inextensible layer of sheet-like material to a second layer of flexible heat-fusible polyurethane foam which comprises holding said polyurethane layer under sufficient tension in a plane of its broad extent to eliminate the tendency to wrinkle when subsequently heated, quickly heating a surface of said polyurethane layer to a limited depth to render said surface soft and tacky, and thereafter pressing the two layers together with the first layer in contact with said tacky surface of said polyurethane layer to effect a bond between such layers, said tension being lateral and longitudinal relative to the plane of the broad extent of said second layer.

2. The method of laminating a first relatively inextensible layer of sheet-like material to a second layer of flexible heat-fusible polyurethane foam having a bonding surface which is adhesive when heated above its melting temperature, which comprises holding the said second layer of flexible foam under sufficient tension longitudinally along the plane of its broad extent to eliminate the tendency to wrinkle when subsequently heated, quickly heating a surface of said second layer to a limited depth to render said surface soft and tacky while said layer is being held under said tension, and thereafter pressing the two layers together with said first layer in contact with the tacky surface of said second layer to effect a bond between such layers.

3. The method of laminating a first layer of material to a second layer of flexible heat-fusible elastic foamed polyurethane which comprises holding said second layer of polyurethane under sufficient tension longitudinally along the plane of its broad extent to eliminate the tendency to wrinkle when subsequently heated and quickly heating a surface of said polyurethane to a limited depth while under tension to a temperature in the range of 500° F. to 800° F. to render said surface soft and tacky and thereafter pressing the two said layers together with said first layer in contact with said tacky surface of said second layer to effect a bond between such layers.

References Cited by the Examiner

UNITED STATES PATENTS 2,861,022  11/1958  Lundsager _____ 156—322 X
2,957,793  10/1960  Dickey _____ 156—82

EARL M. BERGERT, *Primary Examiner.*

M. L. KATZ, *Assistant Examiner.*